May 17, 1960     F. VERES     2,936,923
LAMINATED JOINT FOR GLASS PARTS AND METHOD OF SEALING
Filed Oct. 8, 1956
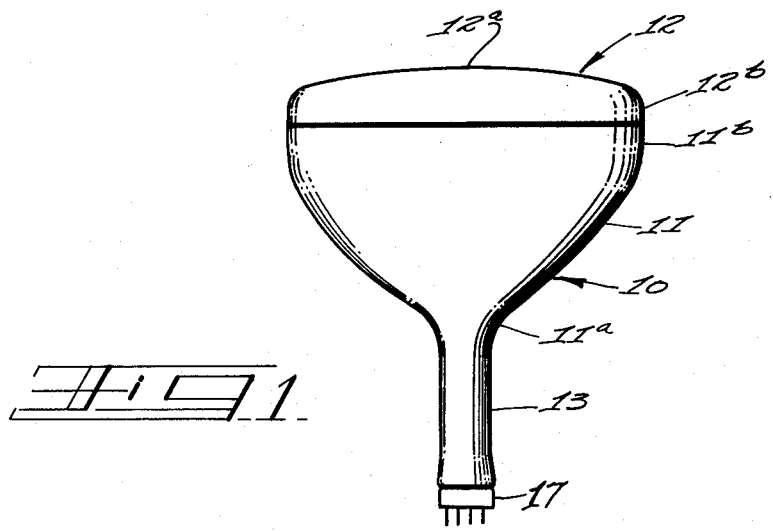
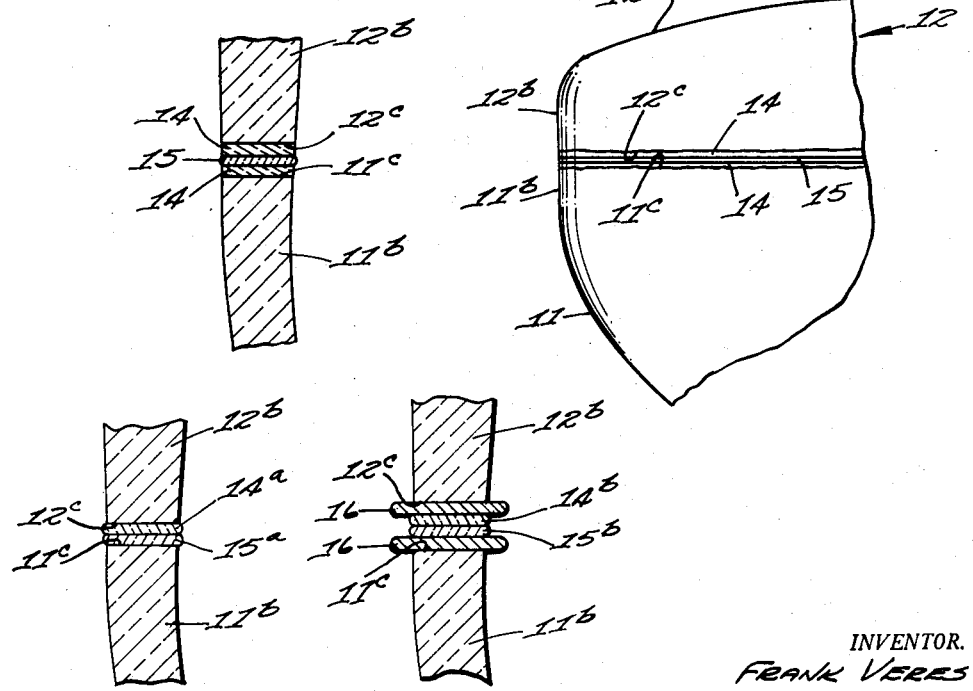
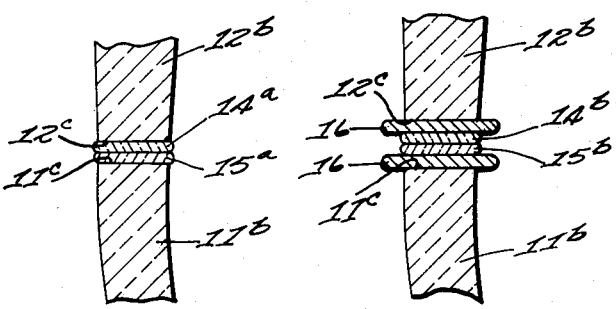
INVENTOR.
FRANK VERES
BY
W. A. Schaich &
Leonard D. Soubier
ATTORNEYS United States Patent Office 2,936,923
Patented May 17, 1960

2,936,923

LAMINATED JOINT FOR GLASS PARTS AND METHOD OF SEALING

Frank Veres, Toledo, Ohio, assignor to Owens-Illinois Glass Company, a corporation of Ohio Application October 8, 1956, Serial No. 614,477

5 Claims. (Cl. 220—2.1)

The present invention relates to an improved joint for uniting prefabricated hollow glass parts to form an evacuated envelope such as a cathode-ray picture tube for television use and to the method of producing such joint.

In the manufacture of vacuumized glass envelopes such as electronic tubes containing heat-sensitive elements which may be easily damaged by overheating, the problem of joining preformed glass parts cannot be conveniently accomplished by direct fusion of the glass. Heretofore, it has been proposed that a single low-melting sealant be fusedly interposed between the two glass parts of an evacuated envelope to maintain a sealed hermetic joint. However, this method of sealing has previously resulted in a joint which has localized and uncontrolled areas of excessive stress which cause the envelope to be highly subject to breakage. It has also been required in such sealing that the complemental sealing surfaces of the two glass parts be initially subjected to extensive grinding and polishing operations to produce mating surfaces for joining. When a low-melting sealant is interposed between the two parts for their sealing, unless the sealing surfaces have been prepared to an extremely high degree of matching accuracy, the sealant due to required sealing fluidity is squeezed out from between high contacting areas of the parts during sealing and vacuumizing. The localized regions of high stress may be either the cause or source of breakage when the envelope is subjected to mild forms of shock.

Therefore, it is an object of this invention to provide a durable, vacuum-tight joint for a glass envelope comprised of a plurality of preformed hollow glass parts having complementary unpolished sealing surfaces which may be effected at relatively low temperatures during fabrication of the envelope.

Another object of this invention is to provide a separable glass envelope for a cathode-ray tube which may be sealed into hermetically assembled relationship with minimized stresses in the glass parts.

Another object of this invention is to provide an improved method of forming a hermetic seal between unpolished complemental sealing surfaces of prefabricated hollow glass parts by interposing a lamination of several glass sealing compositions having differing thermal properties between the sealing surfaces.

Still another object of this invention is to provide an improved joint for sealing the face plate and funnel portions of the cathode-ray tube at their sealing surfaces by fusedly interposing layers of at least two different glass sealing compositions between the sealing surfaces, one being rather viscous to furnish a deformable and load-distributing gasket at the sealing temperature of another lower-melting composition during evacuation of the tube.

The specific nature of this invention, as well as other objects and advantages thereof, will become apparent to those skilled in the art from the following detailed description, which, by way of preferred example only, are illustrated the preferred embodiments of this invention.

On the accompanying drawing:

Fig. 1 is an elevational view of a cathode-ray tube in accordance with the present invention.

Fig. 2 is an enlarged elevational view of one portion of Fig. 1.

Fig. 3 is a further enlarged vertical sectional view of one embodiment of the joint for sealing the cathode-ray tube.

Fig. 4 is a view similar to Fig. 3 of a modification of the invention.

Fig. 5 is a view similar to Fig. 3 of another modification of the invention.

While this invention will be described as specifically applied to the manufacture of a cathode-ray tube, it will be apparent to those skilled in the art that the principles of the invention are equally applicable to the manufacture of any type of evacuated glass envelope formed by assembly of two or more preformed glass parts.

A preferred embodiment of this invention consists of a cathode-ray tube envelope 10 comprised of a glass funnel 11, glass face plate 12 and neck 13 which is normally sealed at its extremity by one or more beam guns 17. Funnel 11 is frusto-conical in shape with its small end 11a sealed to neck 13 and its large end 11b sealed to face plate 12. Face plate 12 consists of a curved viewing panel 12a bounded by a depending annular side panel or flange 12b which terminates in an annular sealing surface 12c.

The overall shape of the glass envelope 10 may be circular or rectangular as conventionally known in the art with sealing surfaces 11c and 12c being reasonably, although not absolutely, planar. Sealing surfaces 11c and 12c may be prepared in any known manner in the molding of the parts or by subsequent shaping to provide reasonably flat complemental surfaces although extensive grinding and polishing are unnecessary in practicing this invention.

As is well known, certain internal electronic elements of the tube such as the phosphor screen (not shown) or beam guns 17 are readily subject to heat damage at elevated temperatures. Hence, it is desirable to effect the sealing of the face plate and funnel portions of the tube at temperatures that are not in excess of those employed in the conventional bake-out operation which is required for all or part of the internal electronic components. Furthermore, in the event of color television, it is an additional requirement that the face plate and funnel portions of the tube be readily separable to permit adjustment and alignment of relatively large internal elements such as the aperture mask or line grid located adjacent to the viewing area. This requirement represents a further disadvantage of sealing techniques heretofore employed which have embodied fusion of at least one portion of the glass parts.

In one previous method of creating face plate and funnel seals for television picture tubes, the sealing surfaces to be joined have been ground relatively flat. One or both of the sealing surfaces are then individually dipped into a bath of molten glass solder to obtain an adherent layer of sealant thereover. The glass solder is subsequently heated to a temperature at which the sealant becomes sufficiently fluid to form the seal between contacted parts. This method has been particularly objectionable because extreme care must be exercised in annealing the glass parts following the dipping, plus other operations employing high temperatures, as these elevated temperatures definitely cause the ground glass surfaces to warp and distort unevenly. Even with grinding approaching so-called optical quality and with only a small amount of subsequent warpage after dipping and annealing, the sealing surfaces of the parts are only able to be contacted in proper alignment at the high points of their sealing areas.

As an example of the amount of atmospheric loading upon an evacuated 21 diagonal inch rectangular picture tube having a projected viewing area of approximately 275 square inches, the total force developed on the seal is approximately 4000 pounds. Obviously this amount of compressive force bearing on three or more contact points of very small area may cause extremely high unit stresses in the glass. Also because the face plate portion of a cathode-ray tube must not be permitted to deform beyond certain small tolerances, sealing under vacuum must be performed at a temperature below which high contact stresses may be relieved by viscous flow of the parent glass.

In order to establish the joint between the sealing edge portions of hollow rigid glass parts in accordance with the present invention, individual layers of high and low melting glass sealing compositions having differing thermal properties are interposed between sealing surfaces $11c$ and $12c$. In one method of practicing the invention, each sealing surface $11c$ and $12c$ is coated with an annular band 14 of relatively high melting, viscous glass sealing composition by dipping each part which is slightly preheated into the composition in molten form. The higher-melting sealing composition is one having a melting point temperature considerably below the annealing and deformation point temperatures of the parent glass and below approximately 1000° F., but is higher-melting although compatible with the lower-melting sealant. An example of such sealing composition is one composed of the following constituents in approximate amounts:

| | |
|---|---|
| PbO _____percent__ | 72 |
| $B_2O_3$ _____do____ | 19 |
| ZnO _____do____ | 9 |
| F.S.P. ° F. _____ | 801 |
| $\alpha \times 10^{-7}$ _____ | 90.6 |

Thin annular bands 14 of the higher-melting glass sealing composition are thus thermally bonded to each sealing surface $11c$ and $12c$.

Another annular band 15 of lower-melting glass sealing composition is then similarly adhered to one or both of the sealing edge portions over first-applied annular band 14 to serve as the fluid sealant. An example of the lower-melting sealing composition is one composed of the following constitutents in approximate amounts:

| | |
|---|---|
| PbO _____percent__ | 70 |
| $B_2O_3$ _____do____ | 14 |
| ZnO+CuO _____do____ | 16 |
| F.S.P., ° F. _____ | 735 |
| $\alpha \times 10^{-7}$ _____ | 90.0 |

The coated glass parts, which may be annealed if desired, are then contacted with their sealing surfaces $11c$ and $12c$ juxtaposed for permanent sealing, normally after all of the internal components of the tube have been properly installed and aligned therein. The annular joint is then subjected to a sealing temperature of the order of about 735° F. or the melting point temperature of the lower-melting sealing composition by gradual heating to soften lower-melting annular band 15 centrally located between the parts (Fig. 3). The annular layers 14 of higher-melting sealing composition possess sufficient viscosity at the sealing temperatures to equally distribute over the entire sealing surfaces $11c$ and $12c$ the compressive force developed by evacuation of the parts during sealing. Thus layers 14 are slightly deformed during the time layer 15 is very fluid to accomplish the vacuumized sealing of slightly uneven surfaces $11c$ and $12c$. Hence, the application of several different sealing compositions between uneven and heavy loaded sealing surfaces is sufficient to provide both the properties of fluidity to facilitate vacuumized sealing and of appreciable viscosity to absorb and uniformly distribute loading at the sealing temperature.

In a modification of the present invention, sealing surface $12c$ is coated with an annular band $14a$ of higher-melting sealing composition by dipping and sealing surface $11c$ is similarly coated with an annular band $15a$ of lower-melting sealing composition in separate operations. Sealing surfaces $11c$ and $12c$ each bearing a single sealing composition are then juxtaposed in contacting alignment (Fig. 4) and the joint subjected to sufficient heat to fully soften and/or melt lower-melting annular band $15a$. Band $14a$ is slightly deformed by evacuation pressure at the sealing temperature to distribute the compressive force over extensive sealing areas into both of the glass parts. This precedure simply requires coating the sealing surfaces of each part with different sealing materials, one exhibiting sufficient fluidity at a relative low sealing temperature and the other sufficient viscosity at this temperature for load distribution.

In another modification of the invention (Fig. 5), ring-like matching metal bands 16 are attached to each of the sealing surfaces $11c$ and $12c$ by either direct glass-to-metal fusion or by interposing a glass-to-metal sealant therebetween. Two annular bands $14b$ and $15b$ of high and low melting glass sealing compositions respectively are interposed between metal bands 16 to accomplish the sealing during envelope evacuation. Bands 16 may be composed of a metallic alloy such as stainless steel. The viscous phase between metal bands 16 is employed to absorb any unevenness or distortion of their surfaces during sealing utilizing the fluidity of the lower-melting phase.

Various modifications may be resorted to within the spirit and scope of the appended claims.

I claim:

1. An envelope for an evacuated cathode-ray tube comprising a glass funnel part and a glass face plate part respectively provided with complemental juxtapositioned unpolished sealing surfaces, at least three thin gaskets interposed between and coextensive with said sealing surfaces, a pair of said gaskets in contact with said sealing surfaces comprised of a glass sealing composition having a melting temperature lower than that of the said glass parts and the intermediate of said gaskets comprised of a glass sealing composition having a melting temperature lower than the melting temperature of the said pair of gaskets, both of said sealing compositions having thermal properties compatible to bonding with said glass parts, said glass sealing composition of lower melting temperature having a melting point temperature adaptable to uniting said glass parts at a sealing temperature of approximately 735° F., said glass sealing composition of higher melting temperature being readily yieldable and deformable for stress distribution at the melting temperature of said composition having the lower melting temperature and under evacuation pressure during fabrication of said envelope.

2. The method of forming a hermetic seal between unpolished complemental sealing surfaces of preformed hollow rigid glass parts comprising the steps of thermally adhering an annular layer of glass sealing composition having a melting temperature lower than that of the said glass parts to each of said sealing surfaces, aligning said sealing surfaces in juxtaposition, interposing an annular layer of glass sealing composition having a melting temperature lower than the melting temperature of the aforementioned sealing composition, and uniting said glass parts into a hermetic envelope by thermally fusing said glass sealing composition of lower melting temperature at a sealing temperature insufficient to deform said rigid glass parts while partially deforming said glass sealing composition of higher melting temperature.

3. The method of forming a hermetic seal between unpolished complemental sealing surfaces of preformed hollow rigid glass parts comprising the steps of thermally adhering an annular layer of first glass sealing composition having a melting temperature lower than that of the said glass parts to each of said sealing surfaces by dipping, thermally adhering an annular layer of a second glass sealing composition having a melting temperature lower than the melting temperature of the said first glass sealing composition to at least one of said sealing surfaces by dipping, aligning said sealing surfaces in juxtaposition and uniting said glass parts into a hermetic envelope by thermally fusing the annular layer of said second glass sealing composition of lower melting temperature at a sealing temperature sufficient to deform slightly said second glass sealing composition of higher melting temperature under compressive loading.

4. The method of forming a hermetic seal between complemental sealing surfaces of two preformed hollow rigid glass parts comprising the steps of dip coating both of said sealing surfaces with an annular band of glass sealing composition having a melting temperature lower than that of the said glass parts, additionally dip coating at least one of said sealing surfaces with an annular band of glass sealing composition having a melting temperature lower than the melting temperature of said first-mentioned coating, juxtapositioning the coated sealing surfaces in contacting alignment, and uniting said glass parts by thermally fusing said glass sealing composition having the lower melting temperature at its melting temperature and at a temperature not in excess of 1000° F., said fusing temperature being insufficient to deform said rigid glass parts although sufficient to deform slightly on sealing said glass sealing composition having the higher melting temperature.

5. The method in accordance with claim 4, including the step of evacuating the aligned hollow glass parts during subjection of said glass sealing composition having the lower melting temperature to its fusing temperature.

References Cited in the file of this patent

UNITED STATES PATENTS

| | | |
|---|---|---|
| 2,248,644 | Reger | July 8, 1941 |
| 2,494,582 | Prokopec | Jan. 17, 1950 |
| 2,618,104 | Goodrich | Nov. 18, 1952 |
| 2,629,093 | Pask | Feb. 17, 1953 |
| 2,643,020 | Dalton | June 23, 1953 |
| 2,752,532 | Dussaussoy | June 26, 1956 |
| 2,824,988 | Cone | Feb. 25, 1958 |

FOREIGN PATENTS

| | | |
|---|---|---|
| 656,805 | Great Britain | Sept. 5, 1951 |